United States Patent [19]

Voss et al.

[11] Patent Number: 5,260,143

[45] Date of Patent: Nov. 9, 1993

[54] METHOD AND APPARATUS FOR REMOVING WATER FROM ELECTROCHEMICAL FUEL CELLS

[75] Inventors: Henry H. Voss; David P. Wilkinson, both of North Vancouver; David S. Watkins, Coquitlam, all of Canada

[73] Assignee: Ballard Power Systems Inc., North Vancouver, Canada

[21] Appl. No.: 641,601

[22] Filed: Jan. 15, 1991

[51] Int. Cl.$^5$ .................... H01M 8/00; H01M 8/04; H01M 8/10
[52] U.S. Cl. ........................... 429/13; 429/30; 429/33; 429/26
[58] Field of Search .................. 429/13, 30, 33, 26

[56] References Cited

U.S. PATENT DOCUMENTS

| | | | |
|---|---|---|---|
| 4,729,932 | 3/1988 | McElvoy | 429/13 |
| 4,795,683 | 1/1989 | McElroy | 429/26 |
| 4,826,742 | 5/1989 | Reiser | 429/26 |
| 4,973,530 | 11/1990 | Vanderborgh et al. | 429/13 |

FOREIGN PATENT DOCUMENTS 2139110  11/1984  United Kingdom .

OTHER PUBLICATIONS

H. Koch et al., "Water Transport Across The Membrane In Solid Polymer Electrolyte Fuel Cell", Extended Abstracts of the Battery Division of the Electrochemical Society, Fall Meeting, Seattle, Washington (Oct. 14–16, 1990). Pages unavailable.
D. Bernardi, "Water-Balance Calculations For Solid-Polymer-Electrolyte Fuel Cells", J. Electrochem. Soc. (vol. 137, No. 11) (Nov. 1990), pp. 3344–3350.

*Primary Examiner*—Anthony McFarlane
*Assistant Examiner*—Nhat D. Phan
*Attorney, Agent, or Firm*—McAndrews, Held & Malloy, Ltd.

[57] ABSTRACT

A method and apparatus is provided for removing water accumulated at the cathode of an electrochemical fuel cell incorporating a solid polymer ion exchange membrane. Liquid water accumulated at the cathode can be removed by maintaining a partial pressure of water vapor in the hydrogen-containing gas supply below the saturation pressure of water vapor therein such that water accumulated at the cathode is drawn by a concentration gradient toward the anode across the membrane and is absorbed as water vapor into the hydrogen-containing gas supply between the inlet and the outlet. In one embodiment, the partial pressure of water vapor in the hydrogen-containing gas supply is maintained below the saturation pressure of water vapor therein by imparting a pressure drop between the inlet and the outlet sufficient to draw water accumulated at the cathode toward the anode. In another embodiment, the partial pressure of water vapor at the inlet of the hydrogen-containing gas supply is maintained at less than the saturation pressure of water vapor therein. Liquid water accumulated at the cathode can also be removed by maintaining a partial pressure of water vapor in the oxygen-containing gas supply below the saturation pressure of water vapor therein such that water accumulated at the cathode is drawn by a concentration gradient and is absorbed as water vapor into the oxygen-containing gas supply between the inlet and the outlet. Liquid water accumulated at the cathode can also be removed by absorbing water vapor into both the hydrogen-containing gas supply and the oxygen-containing gas supply.

28 Claims, 8 Drawing Sheets

Fig. 3 PRESSURE DROP AS A FUNCTION OF HYDROGEN FLOW RATE FOR DIFFERENT ANODE FLOW FIELD GROOVE DEPTHS
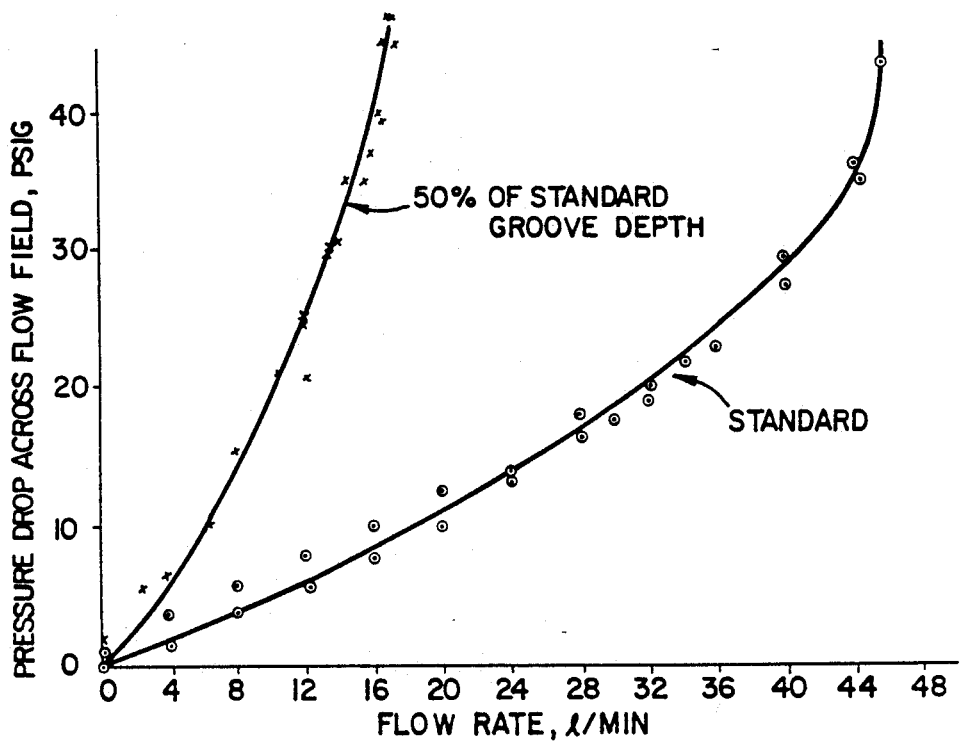
Fig. 4
PRESSURE DROP AS A FUNCTION OF HYDROGEN FLOW RATE FOR DIFFERENT ANODE FLOW FIELD PASSAGE LENGTHS
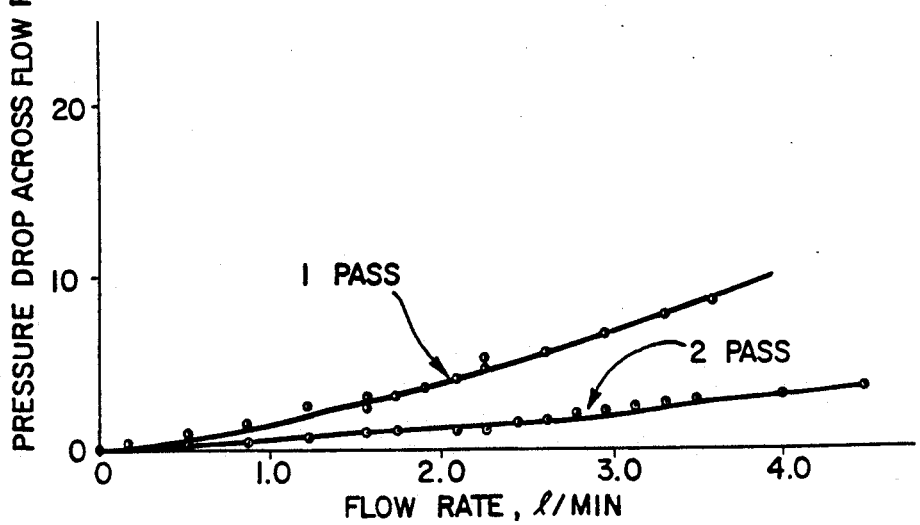

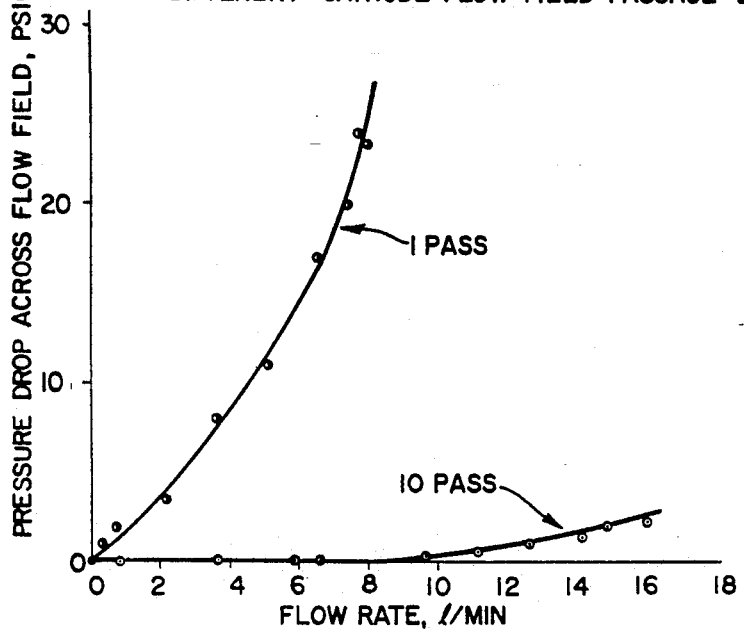
Fig. 5 PRESSURE DROP AS A FUNCTION OF OXIDANT FLOW RATE FOR DIFFERENT CATHODE FLOW FIELD PASSAGE LENGTHS
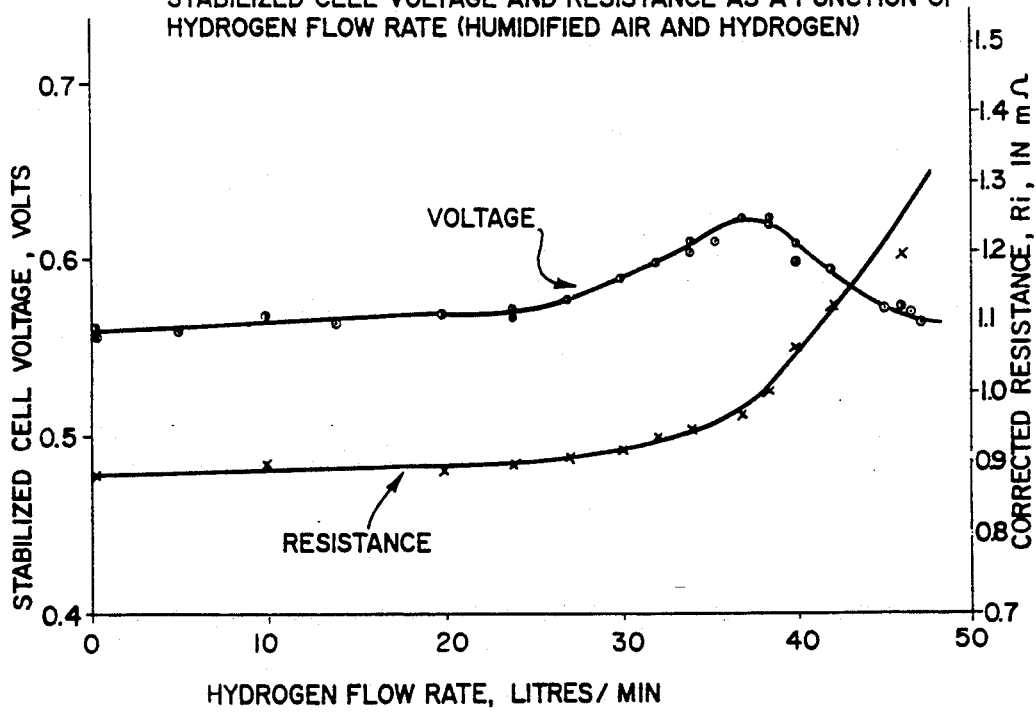
Fig. 6 STABILIZED CELL VOLTAGE AND RESISTANCE AS A FUNCTION OF HYDROGEN FLOW RATE (HUMIDIFIED AIR AND HYDROGEN)

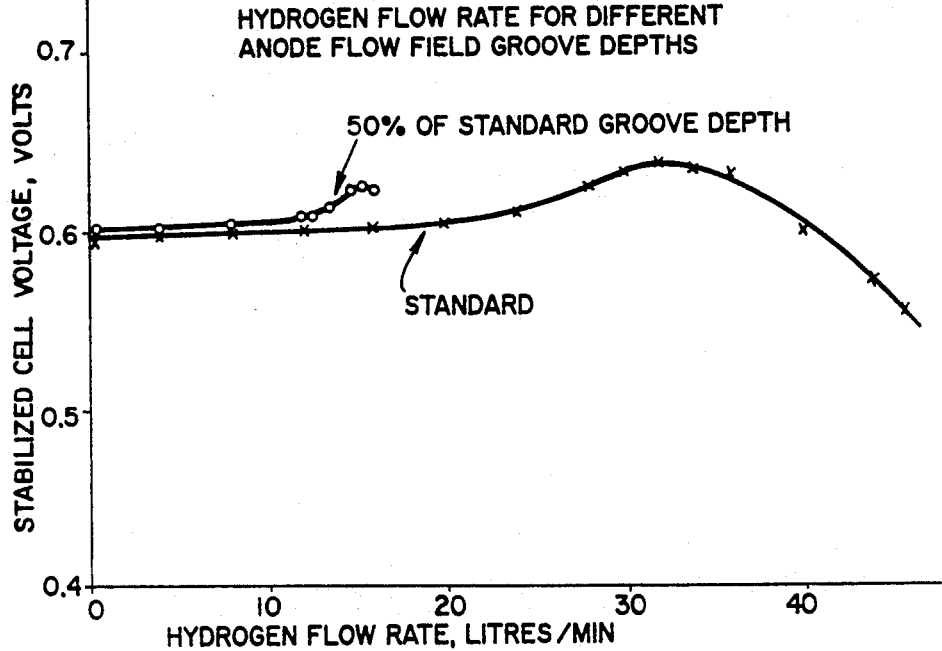
Fig. 7 STABILIZED CELL VOLTAGE AS A FUNCTION OF HYDROGEN FLOW RATE FOR DIFFERENT ANODE FLOW FIELD GROOVE DEPTHS
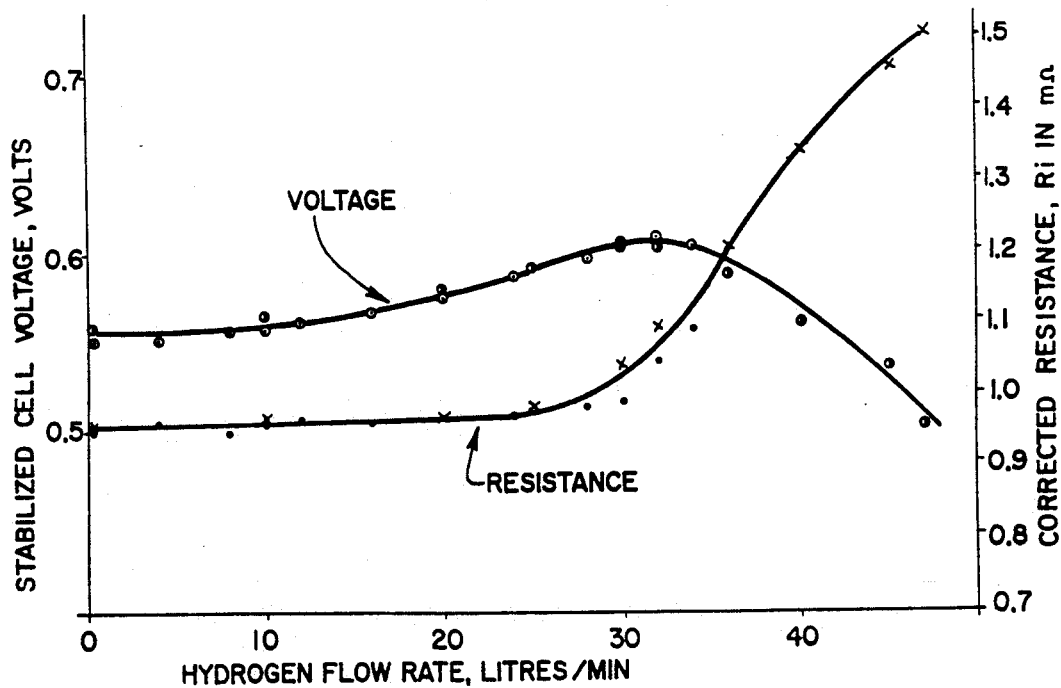
Fig. 8 STABILIZED CELL VOLTAGE AND RESISTANCE AS A FUNCTION OF HYDROGEN FLOW RATE (DRY AIR, HUMIDIFIED HYDROGEN)

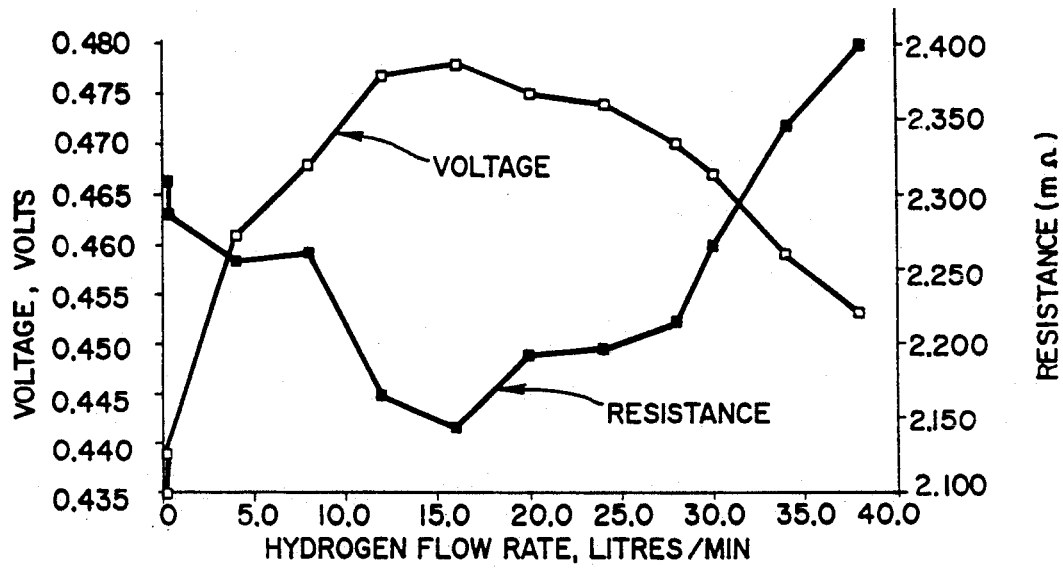
Fig. 9 STABILIZED CELL VOLTAGE AND RESISTANCE AS A FUNCTION OF HYDROGEN FLOW RATE (NAFION 117 MEMBRANE)
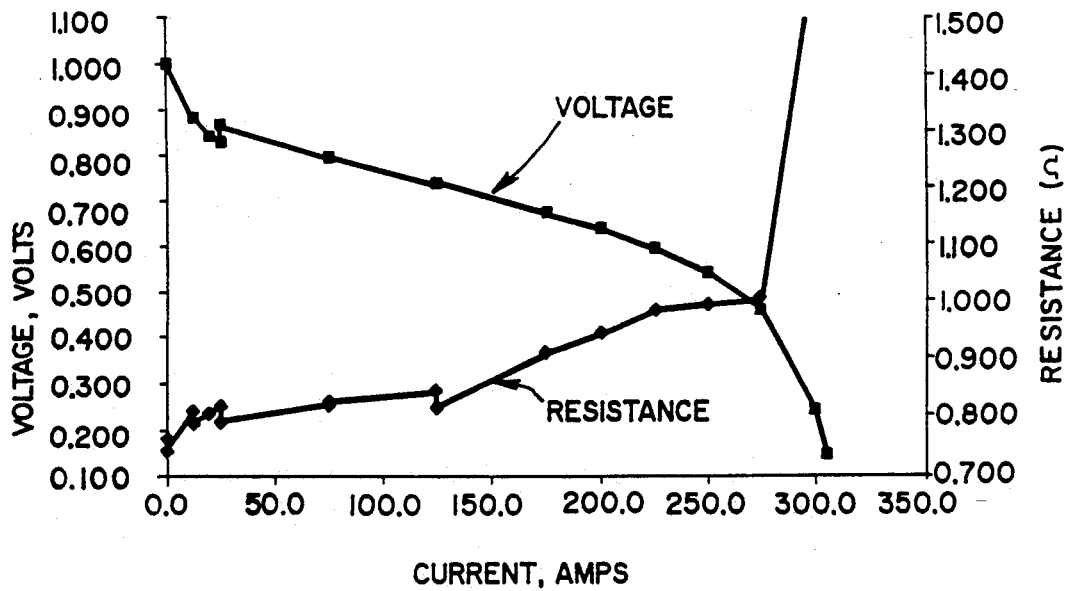
Fig. 10 CELL VOLTAGE AS A FUNCTION OF CURRENT (HUMIDIFIED AIR AND HYDROGEN)

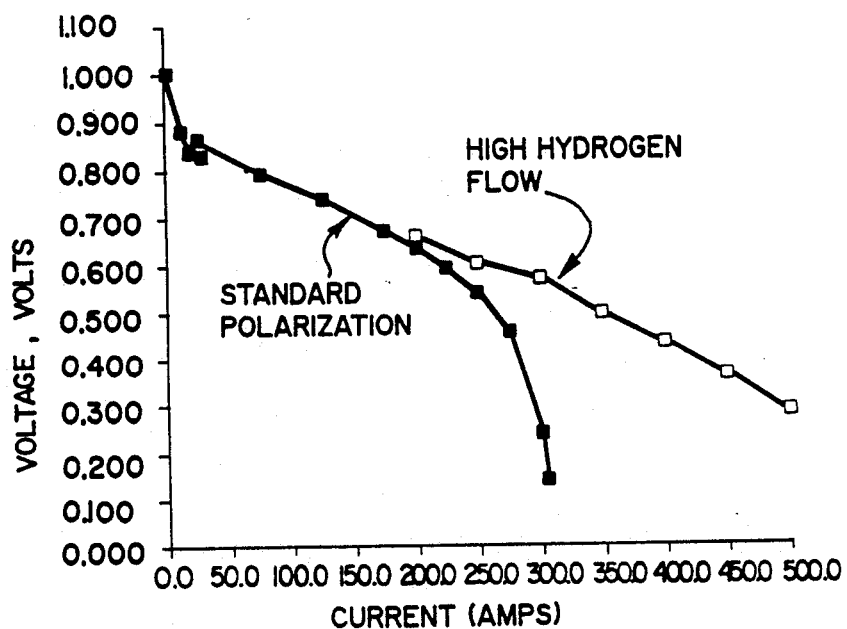
Fig. 11 STABILIZED CELL VOLTAGE AS A FUNCTION OF CURRENT (DOW EXPERIMENTAL MEMBRANE)
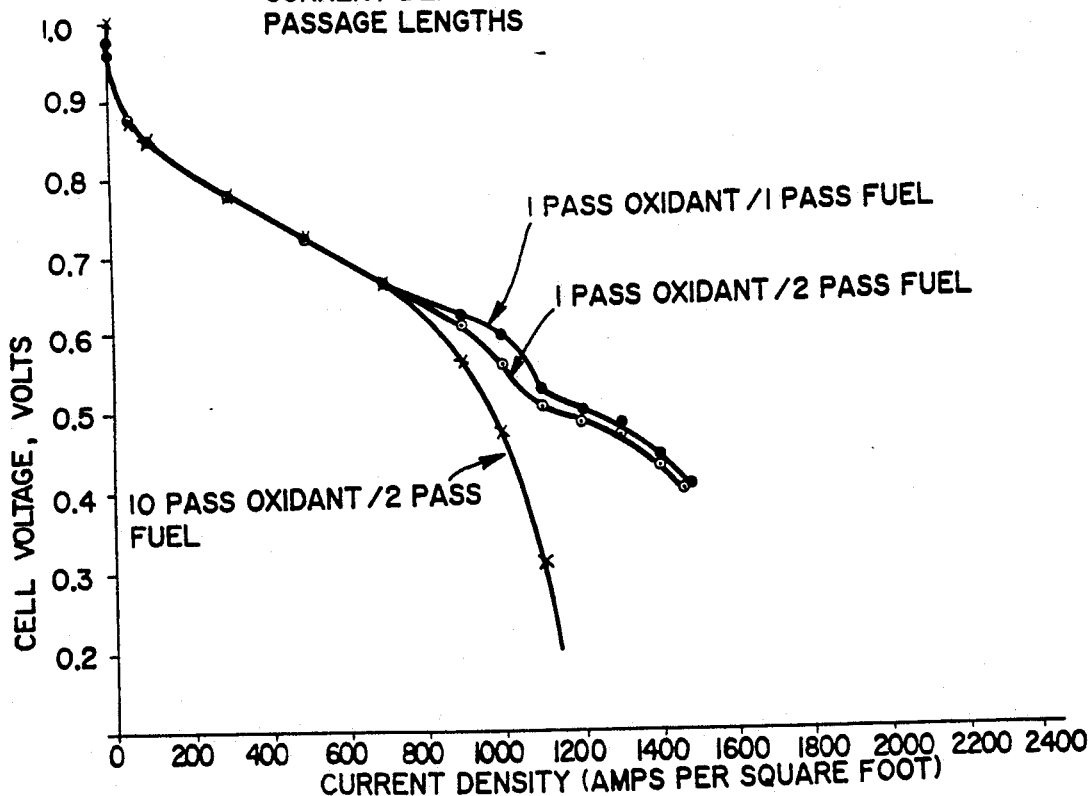
Fig. 12 STABILIZED CELL VOLTAGE AS A FUNCTION OF CURRENT DENSITY FOR DIFFERENT FLOW FIELD PASSAGE LENGTHS

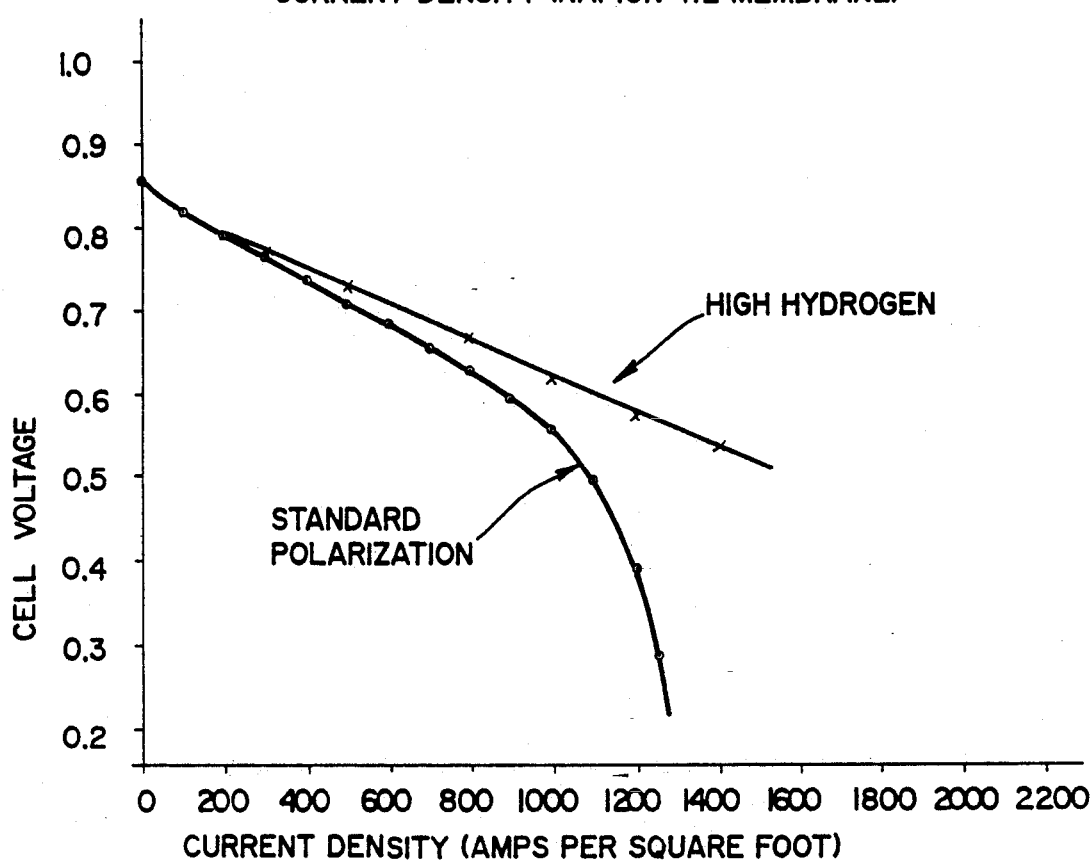
Fig. 13 STABILIZED CELL VOLTAGE AS A FUNCTION OF CURRENT DENSITY (NAFION 112 MEMBRANE)
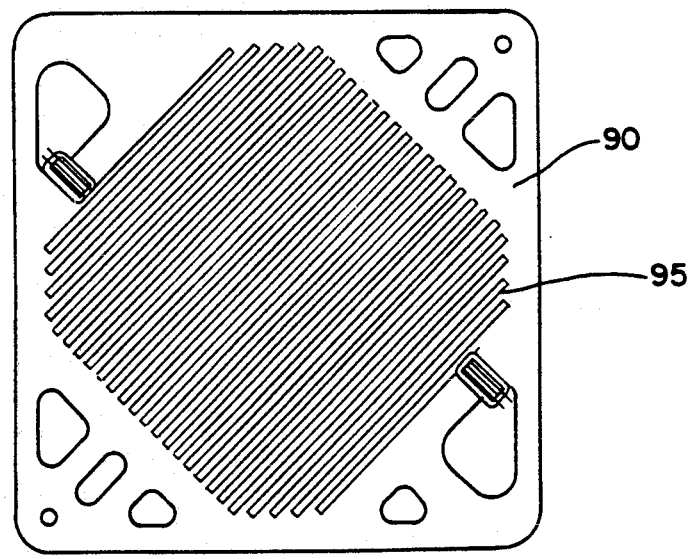
Fig. 14

METHOD AND APPARATUS FOR REMOVING WATER FROM ELECTROCHEMICAL FUEL CELLS

FIELD OF THE INVENTION

The present invention relates to electrochemical fuel cells. More particularly, the present invention relates to a method and apparatus for removing water accumulated at the cathode of electrochemical fuel cells employing solid polymer ion exchange membranes.

BACKGROUND OF THE INVENTION

Electrochemical fuel cells convert fuel and oxidant to electricity and reaction product. In electrochemical fuel cells employing hydrogen as the fuel and oxygen-containing gas as the oxidant, the reaction product is water. Such fuel cells generally contain a membrane electrode assembly ("MEA") consisting of a solid polymer electrolyte or ion exchange membrane disposed between two electrodes formed of porous, electrically conductive sheet material. The electrodes are typically formed of carbon fiber paper. The MEA contains a layer of catalyst at each membrane/electrode interface to induce the desired electrochemical reaction. The MEA is in turn disposed between two plates in which at least one flow passage is engraved or milled. These fluid flow field plates are typically formed of graphite. The fluid flow field passage direct the fuel and oxidant to the respective electrodes, namely, the anode on the fuel side and cathode on the oxidant side. The electrodes are electrically coupled to provide a path for conducting electrons between the electrodes.

At the anode, the fuel permeates the electrode and reacts at the catalyst layer to form cations, which migrate through the membrane to the cathode. At the cathode, the oxygen-containing gas supply reacts at the catalyst layer to form anions. The anions formed at the cathode react with the cations to form a reaction product. In electrochemical fuel cells employing hydrogen as the fuel and oxygen-containing air (or pure oxygen) as the oxidant, a catalyzed reaction at the anode produces hydrogen cations from the fuel supply. The ion exchange membrane facilitates the migration of hydrogen ions from the anode to the cathode. In addition to conducting hydrogen cations, the membrane isolates the hydrogen fuel stream from the oxidant stream comprising oxygen-containing air. At the cathode, oxygen reacts at the catalyst layer to form anions. The anions formed at the cathode react with the hydrogen ions that have crossed the membrane to form liquid water as the reaction product.

Perfluorosulfonic ion exchange membranes, such as those sold by DuPont under its Nafion trade designation, must be hydrated or saturated with water molecules for ion transport to occur. It is generally accepted that such perfluorosulfonic membranes transport cations using a "water pumping" phenomenon. Water pumping involves the transport of cations in conjunction with water molecules, resulting in a net flow of water from the anode side of the membrane to the cathode side. Thus, membranes exhibiting the water pumping phenomenon can dry out on the anode side if water transported along with hydrogen ions (protons) is not replenished. In addition, fuel cells employing such membranes require water to be removed from the cathode (oxidant) side, both as a result of the water transported across the membrane from the water pumping phenomenon and product water formed at the cathode from the reaction of hydrogen ions with oxygen.

The accumulation of water at the cathode is problematic for several reasons. First, the presence of liquid water in the vicinity of the catalyst layer reduces the accessibility of the catalyst to the reactants, resulting in a reduction in the power of the fuel cell. This phenomenon is sometimes referred to as "flooding" of the catalyst site. Secondly, the accumulation of liquid water at the cathode interferes with the permeation of reactants through the cathode to the catalyst, again resulting in a loss of power to the fuel cell. Thirdly, the accumulation of liquid water at the cathode can impart physical changes to the adjacent membrane, causing localized swelling and expansion of the membrane.

Conventional water removal techniques generally involve conducting water accumulated at the cathode away from the cathode catalyst layer and toward the oxidant stream exiting the cathode flow field plate. One conventional water removal technique is wicking, or directing the accumulated water away from the cathode using capillaries incorporated in the cathode. Another related water removal technique employs screens or meshes within the cathode to conduct water away from the catalyst layer. Still another conventional water removal technique is to incorporate hydrophobic substances, such as polytetrafluoroethylene (trade name Teflon), into the cathode sheet material to urge accumulated water away from the cathode. The conventional water removal methods can be disadvantageous because (1) conventional methods involve limited access to the catalyst site since accumulated water is removed in liquid form, and (2) the additional presence of removed water vapor in the oxidant gas stream decreases the mole fraction of oxygen in the stream.

It has been found that a new type of experimental perfluorosulfonic ion exchange membranes, sold by Dow under the trade designation XUS 13204.10, does not appear to significantly exhibit the water pumping phenomenon in connection with the transport of hydrogen ions across the membrane. Thus, the transport of water molecules across these Dow experimental membranes does not appear to be necessary for the transport of hydrogen ions as in the Nafion-type membranes. This absence of water pumping in the Dow experimental membranes avoids the accumulation of transported water at the cathode, and, more importantly, permits the transport of product water across the membrane, in a direction counter to the flow of hydrogen ions across the membrane, for removal on the anode side of the membrane electrode assembly. Water removal on the anode side can also be practiced with Nafion-type membranes. However, the degree of water pumping of such Nafion-type membranes must be considered in determining the net flux of water across the membrane.

Thus, removing water at the anode side of the fuel cell, as opposed to the cathode side, relieves flooding of the catalyst site since transported water does not accumulate in addition to product water at the cathode. Moreover, removing water at the anode side of the fuel cell permits oxygen to flow unimpeded to the cathode catalyst layer.

OBJECTS OF THE INVENTION

An object of the invention is to provide a method and apparatus for removing accumulated water from electrochemical fuel cells to overcome the deficiencies of conventional water removal methods and apparatuses.

Another object of the invention is to provide a method and apparatus for removing accumulated water from electrochemical fuel cells to prevent the flooding of the cathode catalyst layer from water transported across the membrane in conjunction with the transport of hydrogen ions in addition to product water formed at the cathode.

Yet another object of the invention is to provide a method and apparatus for removing water accumulated at the cathode catalyst layer by drawing it as vapor into the reactant gas stream on the anode side of the fuel cell.

A further object of the invention is to provide a method and apparatus for removing water accumulated at the cathode catalyst layer by drawing it as vapor into the reactant gas stream on the cathode side of the fuel cell.

A still further object of the invention is to provide a method and apparatus for removing water accumulated at the cathode catalyst layer by drawing it as vapor into the reactant gas streams on both the anode side and the cathode side of the fuel cell.

SUMMARY OF THE INVENTION

These and other objects are achieved by a method and apparatus for removing water accumulated at the cathode of an electrochemical fuel cell. The fuel cell comprises an anode having a catalyst associated therewith for producing hydrogen ions from a hydrogen-containing gas supply. The hydrogen-containing gas supply has an inlet and an outlet, and a fluid flow passage connecting the inlet and the outlet. The passage communicates with the anode along its extent. The fuel cell further comprises a cathode having a catalyst associated therewith for producing anions from an oxygen-containing gas supply. The anions react with the cations to form liquid water at the cathode. A solid polymer ion exchange membrane is disposed between the anode and the cathode. The membrane facilitates the migration of hydrogen ions from the anode to the cathode and isolates the hydrogen-containing gas supply from the oxygen-containing gas supply. The membrane is permeable to water. The fuel cell further comprises an electrical path for conducting the electrons formed at the anode to the cathode.

The method of removing water at anode side of the fuel cell comprises removing liquid water accumulated at the cathode by maintaining a partial pressure of water vapor in the hydrogen-containing gas supply below the saturation pressure of water vapor therein such that water accumulated at the cathode is drawn by a concentration gradient toward the anode across the membrane and is absorbed as water vapor into the hydrogen-containing gas supply.

In one embodiment of the method, the partial pressure of water vapor in the hydrogen-containing gas supply is maintained below the saturation pressure of water vapor therein by imparting a pressure drop between the inlet and the outlet sufficient to draw water accumulated at the cathode toward the anode. Such a pressure drop can be imparted by (a) a shaped orifice at the inlet, (b) extending the length of the fluid flow passage, (c) varying the cross-sectional area of the fluid flow passage, (d) increasing the friction factor of at least a portion of the interior surface of the fluid flow passage, and (e) maintaining the flow rate of the hydrogen-containing gas supply in the passage substantially higher than the rate at which the hydrogen-containing gas supply is converted to cations at the anode.

In another embodiment of the method, the hydrogen-containing gas supply is introduced into the passage at the inlet having a partial pressure of water vapor less than the saturation pressure of water vapor therein at the operating temperature of the fuel cell. In this controlled humidification embodiment, the hydrogen-containing gas supply either (a) is saturated with water vapor prior to the inlet at a temperature less than the operating temperature of the fuel cell, or (b) comprises a first portion saturated with water vapor prior to the inlet at substantially the operating temperature of the fuel cell and a second substantially unhumidified portion. In fuel cells where the hydrogen-containing gas supply is recirculated between the outlet and the inlet, water vapor can be removed from the hydrogen-containing gas supply prior to the inlet by reducing the temperature of the hydrogen-containing gas supply, condensing a portion of the water vapor in the recirculated hydrogen-containing gas supply, and removing the condensate from the remaining gaseous constituents. In such recirculated systems, water vapor can also be removed from the hydrogen-containing gas supply prior to the inlet by passing the hydrogen-containing gas supply over a desiccant. Water vapor can also be removed from the recirculated hydrogen-containing gas supply prior to the inlet by passing the hydrogen-containing gas supply over one side of a water permeable membrane having a relatively drier gas supply on the opposite side thereof.

In fuel cells wherein the membrane requires the presence of water between the major surfaces thereof to facilitate the migration of the hydrogen ions, the water removal method further comprises maintaining sufficient water between the major surfaces of the membrane to hydrate the membrane.

In addition to the removal of accumulated water at the anode side of the fuel cell, liquid water accumulated at the cathode can also be simultaneously absorbed into the oxygen-containing gas supply by maintaining a partial pressure of water vapor in the oxygen-containing gas supply below the saturation pressure of water vapor therein such that water accumulated at the cathode is drawn by a concentration gradient from the cathode and is absorbed as water vapor into the oxygen-containing gas supply.

A method of removing water accumulated at the cathode into the oxygen-containing gas supply is also provided. The method comprises removing liquid water accumulated at the cathode by maintaining a partial pressure of water vapor in the oxygen-containing gas supply below the saturation pressure of water vapor therein such that water accumulated at the cathode is drawn by a concentration gradient from the cathode and is absorbed as water vapor into the oxygen-containing gas supply between the inlet and the outlet.

One embodiment of the cathode side water removal method comprises imparting a pressure drop between the inlet and the outlet of the oxygen-containing gas supply sufficient to draw water accumulated at the cathode into the oxygen-containing gas supply, using substantially the same means employed to impart a pressure drop in the hydrogen-containing gas supply.

Another embodiment of the cathode side water removal method comprises maintaining the partial pressure of water vapor at the inlet of the oxygen-containing gas supply at less than the saturation pressure of water vapor therein. In fuel cells wherein the oxygen-containing gas supply is recirculated, the means for removing water vapor from the oxygen-containing gas supply prior to the inlet are the same as those for removing water vapor from the hydrogen-containing gas supply.

A generalized method of removing reaction product from an electrochemical fuel cell is also provided. The fuel cell comprises an anode having a catalyst associated therewith for producing reactive cations from a first gaseous reactant supply. The first reactant supply has an inlet and an outlet, and a fluid flow passage connecting the inlet and the outlet. The fuel cell also comprises a cathode having a catalyst associated therewith for producing anions from a second reactant supply. The anions react with the cations to form a liquid reaction product at the cathode. An electrolyte is disposed between the anode and the cathode. The electrolyte facilitates the migration of cations from the anode to the cathode and isolates the first reactant supply from the second reactant supply. The electrolyte is permeable to the reaction product. An electrical path conducts the electrons formed at the anode to the cathode.

The generalized method of removing reaction product from an electrochemical fuel cell method comprises removing the liquid reaction product accumulated at the cathode by maintaining a vapor pressure of reaction product in the first reactant supply below the saturation vapor pressure of reaction product therein such that liquid reaction product accumulated at the cathode is drawn toward the anode through the electrolyte and is absorbed as vapor into the first reactant supply. In one embodiment of the generalized method, the partial pressure of reaction product in the first reactant supply is maintained below the saturation pressure of reaction product therein by imparting a pressure drop between the inlet and the outlet sufficient to draw reaction product accumulated at the cathode toward the anode. In another embodiment of the generalized method, the partial pressure of reaction product at the inlet of the first reactant supply is maintained at less than the saturation pressure of reaction product therein. In addition to removing reaction product on the anode side of the fuel cell, liquid reaction product accumulated at the cathode can also be simultaneously removed at the cathode side by maintaining a partial pressure of reaction product in the second reactant supply below the saturation pressure of reaction product therein such that reaction product accumulated at the cathode is drawn by a concentration gradient from the cathode and is absorbed as vapor into the second reactant supply.

A generalized method of removing liquid reaction product solely from the cathode side of the fuel cell is also provided. The method comprises maintaining a partial pressure of reaction product in the second reactant supply below the saturation pressure of reaction product therein such that reaction product accumulated at the cathode is drawn from the cathode and is absorbed as vapor into the second reactant supply.

BRIEF DESCRIPTION OF THE DRAWINGS

FIG. 3 is a plot of the pressure drop as a function of hydrogen flow rate for (1) a fuel cell employing a standard anode flow field and (2) a fuel cell employing an anode flow field having half the standard groove depth.

FIG. 4 is a plot of the pressure drop as a function of flow rate for (1) a fuel cell employing a single passage anode flow field configuration and (2) a fuel cell employing a two passage anode flow field configuration;

FIG. 5 is a plot of the pressure drop as a function of oxidant flow rate for (1) a fuel cell having a single passage cathode flow field, configuration and (2) a fuel cell having a ten passage cathode flow field configuration;

FIG. 6 is a plot of stabilized cell voltage as a function of hydrogen flow rate in a fuel cell employing the Dow experimental membrane (trade designation XUS 13204.10) and the standard anode flow field configuration of FIG. 3, operated at a constant 250 amps (1000 amperes per square foot) using humidified air and hydrogen reactant streams;

FIG. 7 is a plot of stabilized cell voltage as a function of hydrogen flow rate for a fuel cell employing the Dow experimental membrane and the anode flow field configurations of FIG. 3, showing the effect of decreasing the flow field groove depth in lowering the peak stabilized cell voltage;

FIG. 8 is a plot of stabilized cell voltage as a function of hydrogen flow rate for a fuel cell employed in the experiment of FIG. 6 operated at a constant 250 amps (1000 amperes per square foot) using dry, unhumidified air and humidified hydrogen reactant streams;

FIG. 9 is a plot of cell voltage as a function of hydrogen flow rate for a fuel cell employing a Nafion 117 membrane and the standard anode flow field configuration of FIG. 3, operated at a constant 250 amps (800 amperes per square foot) using humidified-air and hydrogen reactant streams;

FIG. 10 is a standard polarization plot of cell voltage as a function of current for a membrane electrode assembly incorporating the Dow experimental membrane (trade designation XUS 13204.10);

FIG. 11 is a polarization plot of voltage as a function of current for a fuel cell employing the Dow experimental membrane (trade designation XUS 13204.10) superimposing the standard polarization plot of FIG. 10 with the plot of peak stabilized cell voltages obtained at each current in the excess hydrogen flow rate experiments such as that illustrated in FIG. 6;

FIG. 12 is a polarization plot of cell voltage as a function of current density in a fuel cell employing the Dow experimental membrane and different anode and cathode flow field configurations, showing the effect of improved water removal on the cathode side, as well as water removal on both the anode and cathode sides of the fuel cell;

FIG. 13 is a polarization plot of cell voltage as a function of current density in a fuel cell employing the Nafion 112 membrane, superimposing the standard polarization plot with the plot of peak stabilized cell voltages obtained at each current in the excess hydrogen flow rate experiments;

FIG. 14 is a top view of an anode flow field plate with a single passage flow field configuration;

DETAILED DESCRIPTION OF THE DRAWINGS

Figure 1:
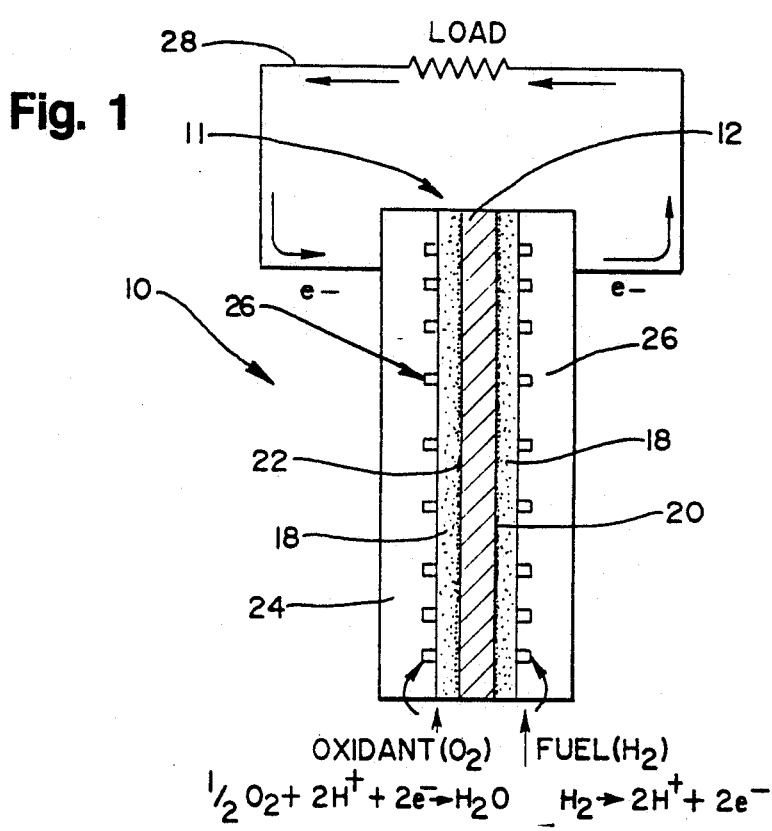
FIG. 1 is a schematic diagram of an electrochemical fuel cell illustrating in cross-section a typical membrane electrode assembly.

Turning first to FIG. 1, a schematic diagram of an electrochemical fuel cell 10 illustrates in cross-section a typical membrane electrode assembly 11. Membrane electrode assembly 11 comprises an electrolyte in the form of a solid polymer ion exchange membrane 12 disposed between a pair of porous electrically conductive sheets 18. In addition to performing an ion exchange function, membrane 12 isolates the hydrogen-containing gas supply from the oxygen-containing gas supply.

Membranes that have been found suitable for electrochemical fuel cell applications are perfluorosulfonic ion exchange membranes such as those sold by DuPont under the trade designation Nafion and an experimental membrane sold by Dow under the trade designation XUS 13204.10. Membrane 12 may have a thickness of about 0.01 inches or less because it has been found that thinner membranes significantly improve fuel cell efficiency.

Sheets 18 are preferably formed of carbon fiber paper. Sheets 18 may also be formed of other suitable electrically conductive sheet material, such as carbon cloth, graphite cloth, carbon foam, and other porous carbon-based materials. A suitable material for carbon fiber paper sheets 18 is sold by Toray under the trade designation "TGP". The preferred carbon fiber paper sheets 18 have a thickness of approximately 0.27 mm and are designated "TGP-90". Other carbon fiber papers could also be used, such as PC206 from Stackpole Corporation or KGF-200 by Kureha. The preferred thickness of the carbon fiber paper is in the range of 0.1 mm to 0.45 mm and preferably about 0.3 mm. The carbon fiber paper has a bulk density in the range of about 0.25 grams per cubic centimeter to about 0.60 grams per cubic centimeter.

The carbon fiber paper sheets 18 are usually impregnated with a hydrophobic polymer, such as TEFLON brand polytetrafluoroethylene, to render the carbon fiber paper sheets 18 hydrophobic as well as to impart additional mechanical strength to sheets 18 so that sheets 18 can properly support membrane 12. The polytetrafluoroethylene is applied to sheets 18 as a slurry in water, and typically includes a dispersing agent. A resin dispersing agent sold by DuPont under the trade designation TEFLON 30B TFE has been found to be suitable for applying the polytetrafluoroethylene polymer.

Each carbon fiber paper sheet 18 is provided with a coating or layer of catalytic material for operation as an anode 20 and a cathode 22, respectively. The preferred catalytic material is platinum in finley comminuted form, sometimes referred to as platinum black.

A pair of electrically conductive flow field plates 24 are provided on the side of each sheet of carbon fiber paper 18 facing away from membrane 12. Flow field plates 24 are preferably formed of graphite. Flow field plates 24 are each provided with at least one groove or channel 26 for directing the fuel and oxidant gases to the anode and cathode respectively. Channels 26 in also serve as passageways for the removal of accumulated water from cathode 22 and anode 20. Flow field plates 24 further serve as the connections to an external electrical circuit 28 through which the electrons formed at the anode flow, as indicated by the arrows in FIG. 1.

In operation, the hydrogen-containing gas supply (designated "fuel" in FIG. 1) permeates carbon fiber paper sheet 18 and reacts at the catalyst layer of anode 20 to form cations (hydrogen ions). The hydrogen ions migrate across membrane 12 to cathode 22. At cathode 22, the cations react with the oxygen-containing gas supply (designated "oxidant" in FIG. 1) at the catalyst layer to form liquid water. The hydrogen ions which cross the membrane to the cathode undergo an electrochemical reaction with oxygen at the cathode catalyst layer to form liquid water as the reaction product.

While the fuel cell 10 illustrated in FIG. 1 contains only one membrane electrode assembly 11, it will be appreciated that fuel cell 10 can comprise a plurality of membrane electrode assemblies 11 connected in series with suitable separator plates between adjacent membrane electrode assemblies 11. Such a series of assemblies 11 is sometimes referred to as a "fuel cell stack".

In fuel cells of the type illustrated in FIG. 1, water accumulates at the cathode as a result of the formation of product water from the reaction of hydrogen ions and oxygen at the cathode. In addition, if the membrane employed in the fuel cell exhibits the water pumping phenomenon in the transport of hydrogen ions across the membrane from the anode to the cathode, such transported water will accumulate at the cathode along with product water. Such accumulated water must be removed, preferably with the reactant gas streams exiting the fuel cell, in order to avoid flooding of the catalyst sites and the resulting degradation of fuel cell performance.

The ability of the reactant gas streams to absorb and carry water vapor is directly related to the temperature and pressure of the gas streams. Under thermodynamic principles, the ratio of the partial pressures of water vapor and reactant gas is equal to the ratio of the molar rates of flow of water vapor and reactant gas. The molar rate of reactant gas flow is, in turn, directly related to the operating stoichiometry of and current generated by the fuel cell.

Figure 2:
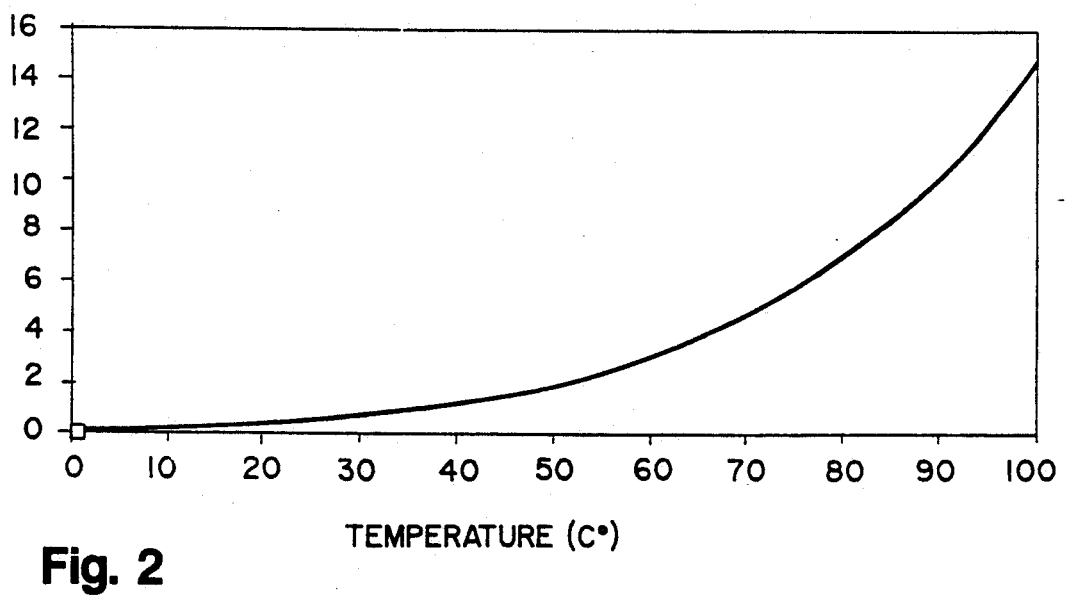
FIG. 2 is a plot of the saturation pressure of water vapor as a function of temperature.

The saturation pressure of water vapor in a reactant gas stream is very dependent upon the temperature of the gas stream. FIG. 2 shows the saturation pressure of water vapor as a function of temperature.

During conventional fuel cell operation, a portion of the reactant gas is consumed by the electrochemical reaction. If the temperature and pressure of the reactant gas streams remains constant, and the reactant gas stream enters the fuel cell fully saturated with water vapor, then the consumption of a portion of the reactant gas would result in the condensation of a portion of the water vapor within the reactant gas stream. Thus, the water absorption ability of a reactant gas stream decreases as the gas is consumed.

If, however, the reactant gas undergoes a pressure drop as it passes between the inlet and the outlet of the flow field, then the water absorption ability of the gas stream will increase. In other words, the water absorption ability of a gas stream increases as the pressure of the gas stream drops. As an example, assume the following:

$m_{vap}$ = molar flow rate of water vapor in reactant gas stream;

$m_{gas}$ = molar flow rate of reactant gas in reactant gas stream;
$P_{vap}$ = water vapor pressure in reactant gas stream;
$P_{gas}$ = reactant gas pressure in reactant gas stream;

$$P_{total} = \text{total pressure in reactant gas stream} = P_{vap} + P_{gas}$$

As discussed above, under thermodynamic principles, $$\frac{m_{vap}}{m_{gas}} = \frac{P_{vap}}{P_{gas}}$$

or $$m_{vap} = m_{gas} * \frac{P_{vap}}{P_{gas}} = m_{gas} * \frac{P_{vap}}{P_{total} - P_{vap}}$$

This value for $m_{vap}$ represents the maximum amount of water that can be carried in a reactant gas stream at a given temperature and pressure.

If the temperature of the reactant gas stream remains a constant 70 degrees C., FIG. 2 shows that the saturation pressure of water vapor in the stream will be 4.5 psia. Thus, where the inlet pressure of the reactant gas stream is 50 psig (65 psia), the molar flow rate of water vapor at the inlet is calculated from the above equations as follows:

$$m_{vap} \text{ (at inlet)} = m_{gas} \text{ (at inlet)} * (4.5/(65 - 4.5))$$
$$= m_{gas} \text{ (at inlet)} * 0.074$$

Where the reactant gas stream undergoes a 30 psi pressure drop (to 35 psia) between the inlet and the outlet, then the molar flow rate of water vapor at the outlet can be similarly calculated from the above equations as follows:

$$m_{vap} \text{ (at outlet)} = m_{gas} \text{ (at outlet)} * (4.5/(35 - 4.5))$$
$$= m_{gas} \text{ (at outlet)} * 0.148$$

If the molar flow rate of reactant gas is sufficiently high that the rate of reactant gas consumption is negligible, then $m_{gas}$ will remain constant between the inlet and the outlet, and the above calculations show that the molar flow rate of water vapor in the gas stream will double as the gas stream undergoes a 30 psi pressure drop between the inlet and the outlet. Thus, the capacity of the gas stream to absorb water vapor significantly increases as the stream undergoes a pressure drop between the inlet and the outlet.

The general formula for pressure drop in a pipe containing a flowing fluid, sometimes referred to as Darcy's equation, is as follows:

$$\Delta P = \frac{\rho * f * l * v^2}{144 * d * 2g}, \text{ where}$$

$\rho$ = fluid density in pound
$f$ = friction factor,
$l$ = length of pipe in feet,
$v$ = velocity of flow in feet per second,
$d$ = internal diameter of pipe in feet, and
$g$ = acceleration of gravity = 32 feet per second per second.

According to Darcy's formula, the pressure drop between the inlet and the outlet of a gas stream in a fuel cell fluid flow field increases with increasing fluid density, friction factor, flow passage length and fluid velocity. Conversely, the pressure drop between the inlet and the outlet of a gas stream decreases with increasing flow passage (groove) diameter.

FIG. 3 is a plot of the pressure drop as a function of hydrogen flow rate for (1) a fuel cell employing a standard anode flow field and (2) a fuel cell employing an anode flow field having half the standard groove depth. FIG. 3 shows that the pressure drop between the inlet and the outlet of the anode flow field significantly increases for a given hydrogen flow rate, consistent with Darcy's formula, when the groove depth is decreased to 50% original ("standard") groove depth.

FIG. 4 is a plot of the pressure drop as a function of flow rate for (1) a fuel cell employing a single passage anode flow field configuration and (2) a fuel cell employing a two passage anode flow field configuration. In both configurations, the cross-sectional area of the individual flow field passages are the same. In a one passage flow field configuration, the length of the passage is approximately twice the length of a two passage configuration. FIG. 4 shows that the pressure drop between the inlet and the outlet of the anode flow field significantly increases for a given hydrogen flow rate, consistent with Darcy's formula, when the length of the flow passage is increased by reducing the number of flow passages from two to one and also reducing the total cross-sectional area of the passages.

FIG. 5 is a plot of the pressure drop as a function of oxidant flow rate for (1) a fuel cell having a single pass cathode flow field configuration and (2) a fuel cell having a ten pass cathode flow field configuration. As with the one passage and two passage anode configuration of FIG. 4, the one passage cathode flow field configuration is approximately ten times the length of the ten passage cathode flow field configuration. FIG. 5 shows that the pressure drop between the inlet and the outlet of the cathode flow field dramatically increases for a given oxidant flow rate, consistent with Darcy's formula, when the length of the flow passage is increased, and the total cross-sectional area of the flow passages decreased, by reducing the number of flow passages from ten to one.

It has been demonstrated that by passing hydrogen fuel gas through the fuel cell at high flow rates, thereby resulting in a pressure drop across the flow field on the anode (fuel) side of the membrane electrode assembly and an increase in the water absorption ability of the fuel gas stream, the performance of the fuel cell is significantly enhanced. The enhancement is believed due to the drawing of water accumulated at the cathode across the membrane by a concentration gradient and its subsequent absorption as water vapor into the hydrogen-containing gas supply between the inlet outlet.

FIG. 6 is a plot of stabilized cell voltage as a function of hydrogen flow rate in a fuel cell employing the Dow experimental membrane (trade designation XUS 13204.10) and the standard anode flow field configuration of FIG. 3, operated at a constant 250 amps (1000 amperes per square foot) using humidified air and hydrogen reactant streams. In the experiment, the following constant operating conditions were maintained: cell temperature = 70 degrees C., 50/50 psig air/H$_2$ (inlet pressures), air stoichiometry=2.0, H₂ stoichiometry variable, air and H₂ humidified at cell temperature, Dow experimental membrane XUS 13204.10. As shown in FIG. 6, the stabilized cell voltage increases slightly with increasing hydrogen flow from an initial value of approximately 0.56 volts, and exhibits a peak stabilized cell voltage of 0.62 volts at about 37 to 38 liters per minute of hydrogen. Cell resistance begins to increase sharply beyond the flow rate for peak voltage, probably due to the drying out of the membrane as a result of the removal from the membrane of more water than is produced at the cathode. Thus, FIG. 6 establishes that employing a high flow rate of hydrogen sufficient to impart a pressure drop to draw product water across the membrane from the cathode to the anode will enhance fuel cell performance by producing a greater cell voltage for a given current (250 amps/1000 amps foot in FIG. 6).

FIG. 7 is a plot of stabilized cell voltage as a function of hydrogen flow rate for a fuel cell employing the Dow experimental membrane and the anode flow field configurations of FIG. 3. FIG. 7 shows that decreasing the flow field groove depth by 50% significantly lowers the hydrogen flow rate required to achieve peak stabilized cell voltage. Thus, FIG. 7 establishes that by reducing the depth of the flow passage, and thereby increasing the pressure drop between the inlet and the outlet of the hydrogen gas stream, the capacity of the stream to absorb water accumulated at the cathode catalyst layer is increased, resulting in a peak stabilized cell voltage at a lower hydrogen flow rate.

FIG. 8 is a plot of stabilized cell voltage as a function of hydrogen flow rate for a fuel cell employed in the experiment of FIG. 6 operated at a constant 250 amps (1000 amperes per square foot) using dry, unhumidified air and humidified hydrogen reactant streams. It was anticipated that the use of dry, unhumidified air would have the effect of reducing the total amount of water accumulated at the cathode catalyst layer because of the absence of condensate water that accumulates at the cathode when humidified air is employed. As shown in FIG. 8, the use of dry, unhumidified air has the effect of reducing the H₂ flow rate required for peak stabilized cell voltage, probably because there is less accumulated water to remove from the cathode in the absence of condensate water. The peak stabilized cell voltage in FIG. 8 occurred at approximately 32 liters per minute of hydrogen, as opposed to approximately 37-38 liters per minute when humidified air was employed (see FIG. 6). It is believed that the peak stabilized voltage did not decrease further because condensate water represents only a small percentage of the total amount of water accumulated at the cathode.

The following table shows the hydrogen flow rates required for peak stabilized voltages at varying currents, with both air and H₂ gases humidified, and where the same operating conditions as the experiment of FIG. 6 were employed:

TABLE 1

Hydrogen Flow Required For Peak Stabilized Voltage At Varying Currents

| Current (amps) | H2 Flow For Peak Stabilized Voltage (liters per minute) | Peak Voltages (volts) |
| --- | --- | --- |
| 125 | no peak | no peak |
| 200 | 31-34 | 0.662 |
| 250 | 36-38 | 0.602 |
| 300 | 36-38 | 0.569 |
| 350 | 38-39 | 0.492 |
| 400 | 42-43 | 0.430 |
| 450 | 46-50 | 0.360 |

FIG. 9 shows the results of an H₂ excess experiment at 200 amps (800 amps per square foot) for a fuel cell operated at the same conditions as in the experiment of FIG. 6, with the exception that a Nafion 117 membrane was employed in place of the Dow experimental membrane XUS 13204.10. As shown in FIG. 9, the stabilized cell voltage increased with increasing hydrogen flow, in a manner similar to the Dow experimental membrane. The hydrogen flow rate for peak voltage occurred at about 15 liters per minute for the Nafion 117 membrane as compared to about 31-34 liters per minute for the Dow membrane at 200 amps. In addition, the shape of the resistance plot for the Nafion 117 membrane is similar to the resistance plot at higher currents for the Dow membrane. These differences can be attributed to the chemical and structural differences between the Dow and Nafion membranes, particularly the water pumping phenomenon in the Nafion membrane which results in the accumulation of transported water at the cathode in addition to product water and condensate water. The mechanism of hydrogen ion transport is believed not to significantly involve the concurrent transport of water molecules from the anode to the cathode. Thus, FIG. 9 establishes that the removal of accumulated water across the membrane and into the hydrogen-containing gas supply enhances the performance of fuel cells employing Nafion membranes.

Turning now to FIG. 10, a standard polarization plot for a membrane electrode assembly incorporating the Dow experimental membrane (trade designation XUS 13204.10) is shown. The fuel cell was operated at a temperature of 70 degrees C., 50/50 psig air/H₂ and stoichiometries of 2.0/1.15 air/H₂. As shown in FIG. 10, fuel cell voltage decreases as current increases, and drops off dramatically above 250 amps. Conversely, fuel cell resistance increases as current increases, and increases dramatically above 250 amps. The degradation in fuel cell performance above 250 amps is believed due to flooding of the cathode catalyst sites as a result of the accumulation of excessive amounts of water from the increased rate of reaction between hydrogen cations and anions at the cathode catalyst layer.

FIG. 11 shows a summary polarization plot of the peak stabilized cell voltages obtained in the hydrogen flow rate experiments using the Dow experimental membrane XUS 13204.10, as summarized above in Table 1, along with the comparative standard polarization plot shown in FIG. 10. As shown in FIG. 11, a significant increase in cell voltage for a given current is achieved in experiments where high hydrogen flow rates were employed. As indicated previously, use of high hydrogen flow rates creates a pressure drop between the inlet and the outlet of the anode flow field such that water accumulated at the cathode catalyst layer is drawn across the membrane, absorbed as water vapor into the hydrogen gas stream, and removed at the anode side of the fuel cell.

FIG. 12 is a polarization plot of cell voltage as a function of current density in a fuel cell employing the Dow experimental membrane and different anode and cathode flow field configurations. The fuel cell was operated at a temperature of 80 degrees C., 30/30 psig air/$H_2$ and stoichiometries of 2.0/1.15 air/$H_2$. In the standard polarization plot shown at the lower portion of FIG. 12, the cathode fluid flow field contained ten passages for the oxidant and the anode fluid flow field contained two passages for the hydrogen (fuel), resulting in a relatively low pressure drop in both the hydrogen and oxidant gas streams. In the middle plot of FIG. 12, the peak stabilized cell voltages are plotted against current density for the fuel cell in which the cathode flow field contained one passage for the oxidant and the anode fluid flow field contained two passages for the hydrogen (fuel). As shown in FIG. 12, a reduction in the number of oxidant flow passages, resulted in an increase in cell voltage for a given current density. This increase in power is believed due to the absorption of water vapor into the oxidant gas stream, inhibiting the accumulation of water at the cathode catalyst layer. In the upper polarization plot of FIG. 12, the peak stabilized cell voltages are plotted against current density for the fuel cell in which the cathode flow field contained one passage for the oxidant and the anode fluid flow field contained one passage for the hydrogen (fuel). In this configuration, a reduction in the number of anode flow passages from two to one, resulted in a further increase in cell voltage for a given current density. This additional increase in power is believed due to the concurrent absorption of water vapor into both the oxidant and hydrogen gas streams. FIG. 12 thus demonstrates the effect of improved water removal on the cathode side, as well as both the cathode and anode sides of the fuel cell.

FIG. 13 is a polarization plot of cell voltage as a function of current density in a fuel cell employing the Nafion 112 membrane. The fuel cell was operated at a temperature of 70 degrees C., 50/50 psig air/$H_2$ and stoichiometries of 2.0/1.15 air/$H_2$. The standard polarization plot is shown at the lower portion of FIG. 13. The peak stabilized cell voltage obtained at each current density in excess hydrogen flow rate experiments is shown in the upper plot of FIG. 13. FIG. 13 demonstrates that increased power is obtained in fuel cells employing Nafion type membranes by imposing a pressure drop between the inlet and the outlet of the hydrogen gas stream such that water is absorbed and removed from the anode side of the fuel cell.

FIG. 14 is a top view of the anode flow field plate with a single passage employed in the excess hydrogen flow rate experiments discussed above.

Figure 15:
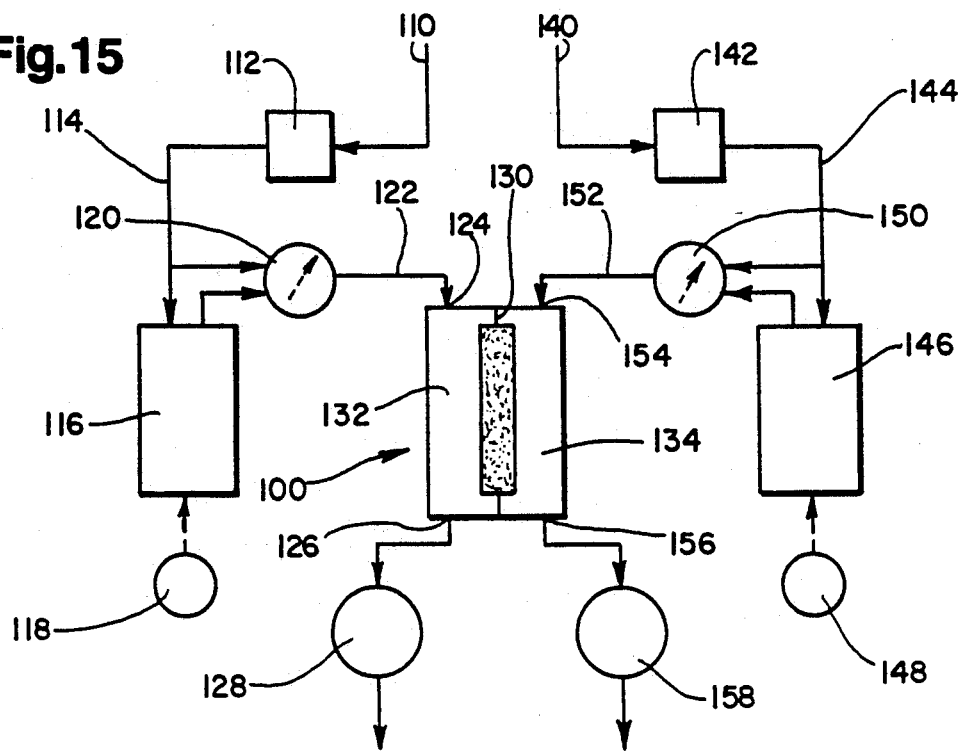
FIG. 15 is a schematic diagram of an apparatus for removing water from an electrochemical fuel cell in which the partial pressure of water vapor at the inlet of the fuel and/or oxidant gas streams is maintained at less than the saturation pressure of water vapor, in the streams through mixing of dry and saturated gas streams.

FIG. 15 is a schematic diagram of an apparatus for removing water from an electrochemical fuel cell. In the apparatus of FIG. 15 fuel gas supply 110 is fed to fuel flow meter 112. A portion of fuel gas stream 114 is directed in dry (unhumidified) form to flow mixing valve 120. The other portion of stream 114 is directed to fuel humidifier 116, the temperature of which is controlled by temperature control 118. The humidified fuel stream exiting humidifier 116 is mixed with the dry fuel stream 114 at flow mixing valve 120. Fuel stream 122 exits flow mixing valve 120 and is fed to the fuel cell hydrogen gas supply inlet 124 with a partial pressure of water vapor less than the saturation pressure of water vapor therein such that water accumulated at the cathode is drawn by a concentration gradient toward the anode across membrane 130 and is absorbed as water vapor into the hydrogen gas supply between inlet 124 and outlet 126. Fuel flow regulator 128 regulates the flow of fuel through fuel cell 100. In the apparatus of FIG. 15, oxidant gas supply 140 is fed to Oxidant flow meter 142. A portion of oxidant gas stream 144 is directed in dry (unhumidified) form to flow mixing valve 150. The other portion of stream 144 is directed to oxidant humidifier 146, the temperature of which is controlled by temperature control 148. The humidified oxidant stream exiting humidifier 146 is mixed with the dry oxidant stream 144 at flow mixing valve 150. Oxidant stream 152 exits flow mixing valve 150 and is fed to the oxidant cell hydrogen gas supply inlet 154 with a partial pressure of water vapor less than the saturation pressure of water vapor therein such that water accumulated at the cathode is drawn by a concentration gradient and is absorbed as water vapor into the oxidant gas supply between inlet 154 and outlet 156. Oxidant flow regulator 158 regulates the flow of oxidant through fuel cell 100. In the apparatus of FIG. 15, flow mixing valves 120 and 150 control the mixing of the dry and humidified gas streams, and therefore the water vapor absorption capacity of the gas streams, based upon the operating conditions and current of fuel cell 100.

Figure 16:
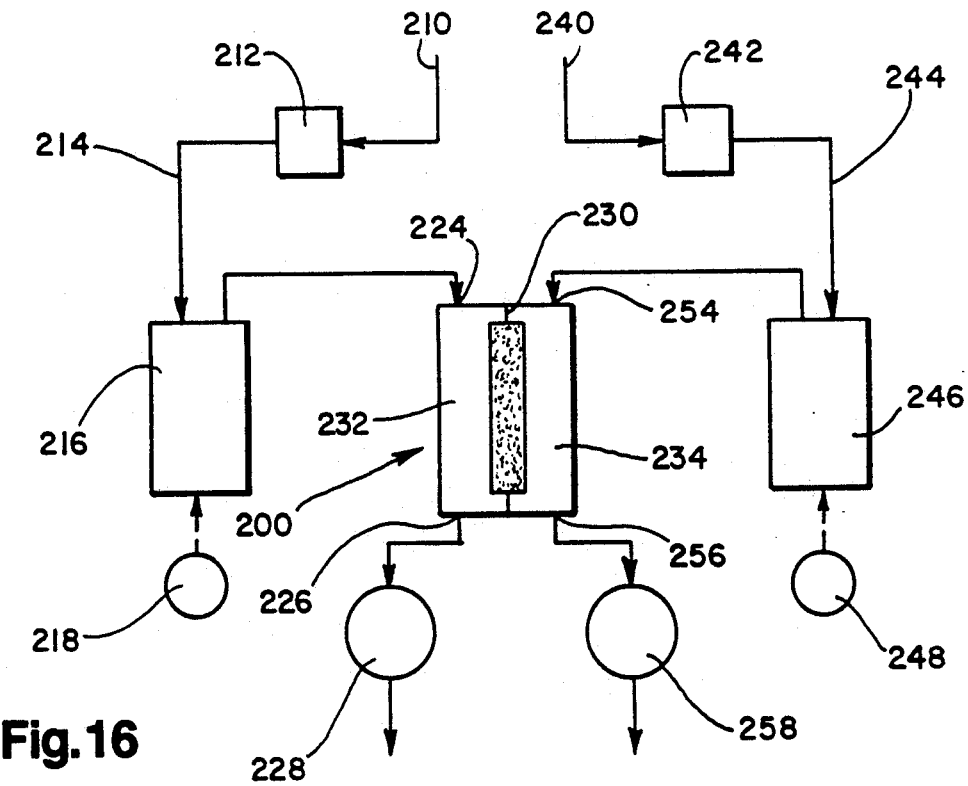
FIG. 16 is a schematic diagram of an apparatus for removing water from an electrochemical fuel cell in which the partial pressure of water vapor at the inlet of the fuel and/or oxidant gas streams is maintained at less than the saturation pressure of water vapor in the streams through temperature control of the gas stream humidifiers.

FIG. 16 is a schematic diagram of another apparatus for removing water from an electrochemical fuel cell. In the apparatus of FIG. 16, fuel gas supply 210 is fed to fuel flow meter 212. Fuel gas stream 214 is directed to fuel humidifier 216, the temperature of which is controlled by temperature controller 218. The saturated fuel stream exiting humidifier 216 is fed to the fuel cell hydrogen gas supply inlet 224 with a partial pressure of water vapor less than the saturation pressure of water vapor therein at the fuel cell operating temperature such that water accumulated at the cathode is drawn by a concentration gradient toward the anode across membrane 230 and is absorbed as water vapor into the hydrogen gas supply between inlet 224 and outlet 226. Fuel flow regulator 228 regulates the flow of fuel through fuel cell 200. In the apparatus of FIG. 16, oxidant gas supply 240 is fed to oxidant flow meter 242. Oxidant gas stream 144 is directed to oxidant humidifier 246, the temperature of which is controlled by temperature controller 248. The humidified oxidant stream exiting humidifier 246 is fed to the oxidant cell hydrogen gas supply inlet 254 with a partial pressure of water vapor less than the saturation pressure of water vapor therein at the fuel cell operating temperature such that water accumulated at the cathode is drawn by a concentration gradient and is absorbed as water vapor into the oxidant gas supply between inlet 254 and outlet 256. Oxidant flow regulator 258 regulates the flow of oxidant through fuel cell 200. In the apparatus of FIG. 16, temperature controllers 218 and 248 regulate the temperature of fuel and oxidant humidifiers 216 and 246, respectively, thereby controlling the partial pressure of water vapor at the inlet of the fuel and oxidant streams, based upon the operating conditions and current of fuel cell 200.

In either the case of removing water at the anode side of the fuel cell or removing water at the cathode side, fuel cell performance is enhanced in that higher voltages are achieved at particular current densities than in previous designs. The inventors believe that the performance enhancement is due, at least in part, to the ability of the oxidant to more readily contact the catalyst. The presence of accumulated, unremoved water in prior art designs may have rendered the catalyst inaccessible to a portion of the oxidant. The more efficient removal of water using the present method and apparatus increases the availability of the catalyst to the reactants at the cathode, and thereby increases the voltages achievable at given fuel cell currents. Such an increase in voltage at given currents increases the net power available from the fuel cell. Moreover, the extension of the polarization plot increases the stability of the fuel cell in operating ranges that were previously sensitive to water flooding. Small changes in current, temperatures and membrane electrode assembly structure no longer result in dramatic changes in voltage in the sensitive region of the polarization plot.

In addition to voltage enhancement, the present method and apparatus provide a diagnostic tool for evaluating proposed modifications to membrane electrode assemblies and associated flow field structures. In this regard, the hydrogen excess experiments permit the quantitative determination of effect of a modification on water removal and thus fuel cell performance. For example, modifications that facilitate the removal of water from the cathode should effect a lowering of the hydrogen flow rate or anode flow field pressure drop at which peak stabilized voltage is achieved.

While particular elements and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of removing water accumulated at the cathode of an electrochemical fuel cell, said fuel cell comprising an anode having a catalyst associated therewith for producing cations from a hydrogen-containing gas supply said hydrogen-containing gas supply having an inlet, an outlet and a fluid flow passage connecting said inlet and said outlet, said passage communicating with said anode along its extent; a cathode having a catalyst associated therewith for producing anions from an oxygen-containing gas supply, said anions reacting with said cations to from liquid water at said cathode; a solid polymer ion exchange membrane disposed between said anode and said cathode, said membrane facilitating the migration of cations from said anode to said cathode and isolating said hydrogen-containing gas supply from said oxygen-containing gas supply, said membrane permeable to water; and an electrical path for conducting the electrons formed at said anode to said cathode; said method comprising:
   removing liquid water accumulated at said cathode by maintaining a partial pressure of water vapor in said hydrogen-containing gas supply below the saturation pressure of water vapor therein such that water accumulated at said cathode is drawn by a concentration gradient toward said anode across said membrane and is absorbed as water vapor into said hydrogen-containing gas supply, wherein the partial pressure of water vapor in said hydrogen-containing gas supply is maintained below the saturation pressure of water vapor therein by imparting a pressure drop within said fuel cell between said inlet and outlet.

2. The method of claim 1 wherein said pressure drop is imparted by at least one shaped orifice at said inlet.

3. The method of claim 2 wherein said pressure drop is imparted by extending the length of said fluid flow passage.

4. The method of claim 1 wherein said pressure drop is imparted by varying the cross-sectional area of said fluid flow passage.

5. The method of claim 1 wherein said pressure drop is imparted by increasing the friction factor of at least a portion of the interior surface of said fluid flow passage.

6. The method of claim 1 wherein said pressure drop is imparted by maintaining the flow rate of said hydrogen-containing gas supply in said passage substantially higher than the rate at which said hydrogen-containing gas supply is converted to cations at said anode.

7. The method of claim 1 wherein said membrane further requires the presence of water between the major surfaces thereof to facilitate the migration of said cations and said method further comprises maintaining sufficient water between the major surfaces of said membrane to hydrate said membrane.

8. The method of claim 1 wherein said oxygen-containing gas supply has an inlet, an outlet and a fluid flow passage connecting said oxygen-containing gas supply inlet and outlet, said passage communicating with said cathode along its extent, and said method further comprises removing liquid water accumulated at said cathode by maintaining a partial pressure of water vapor in said oxygen-containing gas supply below the saturation pressure of water vapor therein such that water accumulated at said cathode is drawn by a concentration gradient from said cathode and is absorbed as water vapor into said oxygen-containing gas supply, wherein the partial pressure of water vapor in said oxygen-containing gas supply is maintained below the saturation pressure of water vapor therein by imparting a pressure drop within said fuel cell between said oxygen-containing gas supply inlet and outlet.

9. A method of removing water accumulated at the cathode of an electrochemical fuel cell, said fuel cell comprising an anode having a catalyst associated therewith for producing cations from a hydrogen-containing gas supply; a cathode having a catalyst associated therewith for promoting an electrochemical reaction between said hydrogen ions and an oxygen-containing gas supply to form liquid water at said cathode, said oxygen-containing gas supply having an inlet, an outlet and a fluid flow passage connecting said inlet and said outlet, said passage communicating with said cathode along its extent; a solid polymer ion exchange membrane disposed between said anode and said cathode, said membrane facilitating the migration of hydrogen ions from said anode to said cathode and isolating said hydrogen-containing gas supply from said oxygen-containing gas supply; and an electrical path for conducting the electrons formed at said anode to said cathode; said method comprising:
   removing liquid water accumulated at said cathode by maintaining a partial pressure of water vapor in said oxygen-containing gas supply below the saturation pressure of water vapor therein such that water accumulated at said cathode is drawn by a concentration gradient from said cathode and is absorbed as water vapor into said oxygen-containing gas supply, wherein the partial pressure of water vapor in said oxygen-containing gas supply is maintained below the saturation pressure of water vapor therein by imparting a pressure drop within said fuel cell between said inlet and outlet.

10. The method of claim 9 wherein said pressure drop is imparted by at least one shaped orifice at said inlet.

11. The method of claim 9 wherein said pressure drop is imparted by extending the length of said fluid flow passage.

12. The method of claim 9 wherein said pressure drop is imparted by varying the cross-sectional area of said fluid flow passage.

13. The method of claim 9 wherein said pressure drop is imparted by increasing the friction factor of at least a portion of the interior surface of said fluid flow passage.

14. The method of claim 9 wherein said pressure drop is imparted by maintaining the flow rate of said oxygen-containing gas supply substantially higher than the rate at which said oxygen-containing gas supply is converted to anions at said cathode.

15. The method of claim 9 wherein said membrane further requires the presence of water between the major surfaces thereof to facilitate the migration of said cations and said method further comprises maintaining sufficient water between the major surfaces of said membrane to hydrate said membrane.

16. A method of removing reaction product from an electrochemical fuel cell, said fuel cell comprising an anode having a catalyst associated therewith for producing reactive cations from a first gaseous reactant supply, said first reactant supply having an inlet, an outlet and a fluid flow passage connecting said inlet and said outlet; a cathode having a catalyst associated therewith for producing anions from a second reactant supply, said anions reacting with said cations to form a liquid reaction product at said cathode; an electrolyte disposed between said anode and said cathode, said electrolyte facilitating the migration of cations from said anode to said cathode and isolating said first reactant supply from said second reactant supply, said electrolyte permeable to said reaction product; and an electrical path for conducting the electrons formed at said anode to said cathode; said method comprising:
removing the liquid reaction product accumulated at said cathode by maintaining a vapor pressure of reaction product in said first reactant supply below the saturation vapor pressure of reaction product therein such that liquid reaction product accumulated at said cathode is drawn by a concentration gradient toward said anode through said electrolyte and is absorbed as vapor into said first reactant supply, wherein the partial pressure of reaction product in said first reactant supply is maintained below the saturation pressure of reaction product therein by imparting a pressure drop within said fuel between said inlet and outlet.

17. The method of claim 16 wherein said second reactant supply has an inlet, an outlet and a fluid flow passage connecting said second reactant supply inlet and outlet, said fluid flow passage communicating with said cathode along its extent, and said method further comprises removing reaction product accumulated at said cathode by maintaining a partial pressure of reaction product in said second reactant supply below the saturation pressure of reaction product therein such that reaction product accumulated at said cathode is drawn by a concentration gradient from said cathode and is absorbed as vapor into said second reactant supply, wherein the partial pressure of reaction product in said second reactant supply is maintained below the saturation pressure of reaction product therein by imparting a pressure drop within said fuel cell between said second reactant supply inlet and outlet.

18. A method of removing reaction product from an electrochemical fuel cell, said fuel cell comprising an anode having a catalyst associated therewith for producing reactive cations from a first reactant supply; a cathode having a catalyst associated therewith for promoting an electrochemical reaction between said cations and a second reactant supply to from a liquid reaction product at said cathode, said second reactant supply having an inlet, an outlet and a fluid flow passage connecting said inlet and said outlet, said passage communicating with said cathode along its extent; an electrolyte disposed between said anode and said cathode, said electrolyte facilitating the migration of cations from said anode to said cathode and isolating said first reactant supply from said second reactant supply; and an electrical path for conducting the electrons formed at said anode to said cathode; said method comprising:
removing liquid reaction product accumulated at said cathode by maintaining a partial pressure of reaction product in said second reactant supply below the saturation pressure of reaction product therein such that reaction product accumulated at said cathode is drawn by a concentration gradient from said cathode and is absorbed as vapor into said second reactant supply, wherein the partial pressure of reaction product in a said second reactant supply is maintained below the saturation pressure of reaction product therein by imparting a pressure drop within said fuel cell between said second reactant supply inlet and outlet.

19. A method of removing water accumulated at the cathode of an electrochemical fuel cell, said fuel cell comprising an anode having a catalyst associated therewith for producing cations from a hydrogen-containing gas supply, said hydrogen-containing gas supply having an inlet and an outlet, said inlet and outlet fluidly interconnected for dispersing said hydrogen-containing gas to said anode; a cathode having a catalyst associated therewith for producing anions from an oxygen-containing gas supply, said anions reacting with said cations to form liquid water at said cathode; a solid polymer ion exchange membrane disposed between said anode and said cathode, said membrane facilitating the migration of cations from said anode to said cathode and isolating said hydrogen-containing gas supply from said oxygen-containing gas supply, said membrane permeable to water; and an electrical path for conducting the electrons formed at said anode to said cathode; said method comprising:
removing liquid water accumulated at said cathode by maintaining a partial pressure of water vapor in said hydrogen-containing gas supply below the saturation pressure of water vapor therein such that water accumulated at said cathode is drawn by a concentration gradient toward said anode across said membrane and is absorbed as water vapor into said hydrogen-containing gas supply, wherein the partial pressure of water vapor in said hydrogen-containing gas supply is maintained below the saturation pressure of water vapor therein by imparting a pressure drop within said fuel cell between said inlet and outlet.

20. The method of claim 19 wherein said pressure drop is imparted by maintaining the flow rate of said hydrogen-containing gas supply between said inlet and said outlet substantially higher than the rate at which said hydrogen-containing gas supply is converted to cations at said anode.

21. The method of claim 18 wherein said membrane further requires the presence of water between the major surfaces thereof to facilitate the migration of said cations and said method further comprises maintaining sufficient water between the major surfaces of said membrane to hydrate said membrane.

22. The method of claim 19 wherein said oxygen-containing gas supply has an inlet and an outlet, said oxygen-containing gas supply inlet and outlet fluidly interconnected for dispersing said oxygen-containing gas to said cathode, and said method further comprises removing liquid water accumulated at said cathode by maintaining a partial pressure of water vapor in said oxygen-containing gas supply below the saturation pressure of water vapor therein such that water accumulated at said cathode is drawn by a concentration gradient from said cathode and is absorbed as water vapor into said oxygen-containing gas supply, wherein the partial pressure of water vapor in said oxygen-containing gas supply is maintained below the saturation pressure of water vapor therein by imparting a pressure drop within said fuel cell between said oxygen-containing gas supply inlet and outlet.

23. A method of removing water accumulated at the cathode of an electrochemical fuel cell, said fuel cell comprising an anode having a catalyst associated therethrough for producing cations from a hydrogen-containing gas supply; a cathode having a catalyst associated therewith for promoting an electrochemical reaction between said hydrogen ions and an oxygen-containing gas supply to form liquid water at said cathode, said oxygen-containing gas supply having an inlet and an outlet, said inlet and outlet fluidly interconnected to disperse said oxygen-containing gas supply to said cathode; a solid polymer ion exchange membrane disposed between said anode and said cathode, said membrane facilitating the migration of hydrogen ions from said anode to said cathode and isolating said hydrogen-containing gas supply from said oxygen-containing gas supply; and an electrical path for conducting the electrons formed at said anode to said cathode; said method comprising:

removing liquid water accumulated at said cathode by maintaining a partial pressure of water vapor in said oxygen-containing gas supply below the saturation pressure of water vapor therein such that was accumulated at said cathode is drawn by a concentration gradient from said cathode and is absorbed as water vapor into said oxygen-containing gas supply, wherein the partial pressure of water in said oxygen-containing gas supply is maintained below the saturation pressure of water vapor therein by imparting a pressure drop within said fuel cell between said inlet and outlet.

24. The method of claim 23 wherein said pressure drop is imparted by maintaining the flow rate of said oxygen-containing gas supply substantially higher than the rate at which said oxygen-containing gas supply is converted to anions at said cathode.

25. The method of claim 23 wherein said membrane further requires the presence of water between the major surfaces thereof to facilitate the migration of said cations and said method further comprises maintaining sufficient water between the major surfaces of said membrane to hydrate said membrane.

26. A method of removing reaction product from an electrochemical fuel cell, said fuel cell comprising an anode having a catalyst associated therewith for producing reactive cations from a first gaseous reactant supply, said first reactant supply having an inlet and an outlet, said inlet and outlet fluidly interconnected to disperse said first gaseous reactant to said anode; a cathode having a catalyst associated therewith for producing anions from a second reactant supply, said anions reacting with said cations to form a liquid reaction product at said cathode; an electrolyte disposed between said anode and said cathode, said electrolyte facilitating the migration of cations from said anode to said cathode and isolating said first reactant supply from said second reactant supply, said electrolyte permeable to said reaction product; and an electrical path for conducting the electrons formed at said anode to said cathode; said method comprising:

removing the liquid reaction product accumulated at said cathode by maintaining a vapor pressure of reaction product in said first reactant supply below the saturation vapor pressure of reaction product therein such that liquid reaction product accumulated at said cathode is drawn by a concentration gradient toward said anode through said electrolyte and is absorbed as vapor into said first reactant supply, wherein the partial pressure of reaction product in said first reactant supply is maintained below the saturation pressure of reaction product therein by imparting a pressure drop within said fuel cell between said inlet and outlet.

27. The method of claim 26 wherein said second reactant supply has an inlet and an outlet, said second reactant supply inlet and outlet fluidly interconnected to disperse said second reactant to said cathode, and said method further comprises removing reaction product accumulated at said cathode by maintaining a partial pressure of reaction product in said second reactant supply below the saturation pressure of reaction product therein such that reaction product accumulated at said cathode is drawn by a concentration gradient from said cathode and is absorbed as vapor into said second reactant supply, wherein the partial pressure of reaction product in said second reactant supply is maintained below the saturation pressure of reaction product therein by imparting a pressure drop within said fuel cell between said second reactant supply inlet and outlet.

28. A method of removing reaction product from an electrochemical fuel cell, said fuel cell comprising an anode having a catalyst associated therewith for producing reactive cations from a first reactant supply; a cathode having a catalyst associated therewith for promoting an electrochemical reaction between said cations and a second reactant supply to form a liquid reaction product at said cathode, said second reactant supply having an inlet and an outlet, said second reactant supply inlet and outlet fluidly interconnected to disperse said second reactant to said cathode; an electrolyte disposed between said anode and said cathode, said electrolyte facilitating the migration of cations from said anode to said cathode and isolating said first reactant supply from said second reactant supply; and an electrical path for conducting the electrons formed at said anode to said cathode; said method comprising:

removing liquid reaction product accumulated at said cathode by maintaining a partial pressure of reaction product in said second reactant supply below the saturation pressure of reaction product therein such that reaction product accumulated at said cathode is drawn by a concentration gradient from said cathode and is absorbed as vapor into said second reactant supply, wherein the partial pressure of reaction product in said second reactant supply is maintained below the saturation pressure of reaction product therein by imparting a pressure drop within said fuel cell between said inlet and outlet.

* * * * *